May 13, 1930.  H. FORD  1,758,597
TRANSMISSION
Filed Feb. 18, 1929  4 Sheets-Sheet 1
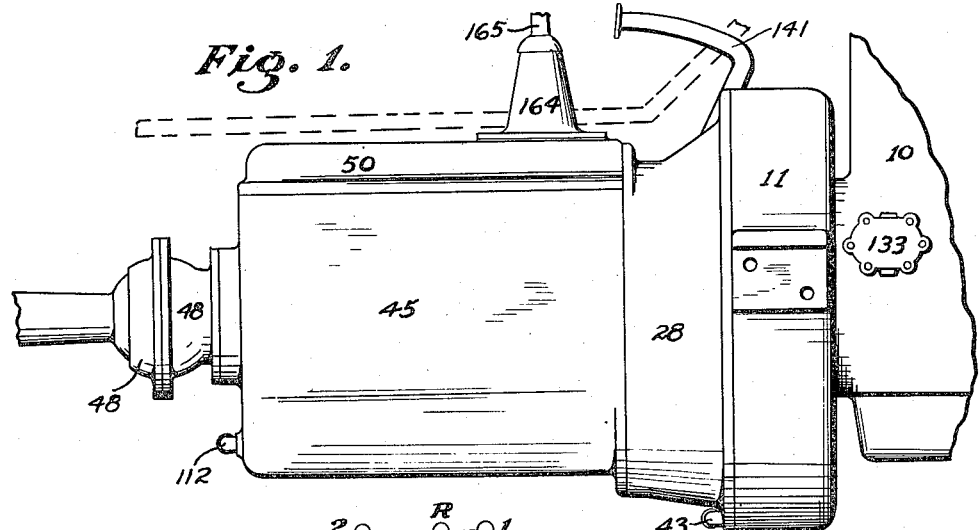
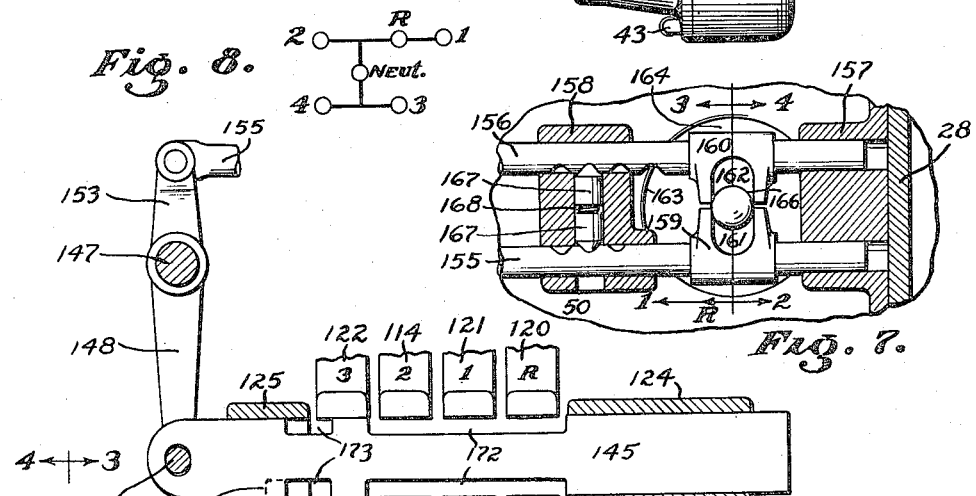
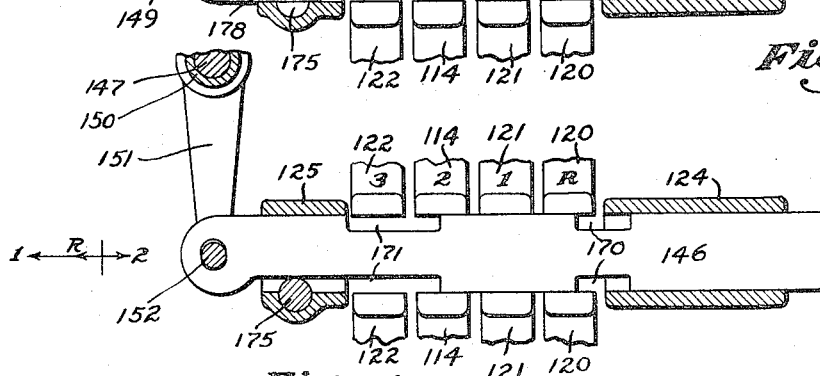
INVENTOR
Henry Ford.
BY C. R. Halbert
E. L. Davis
ATTORNEYS.

May 13, 1930.  H. FORD  1,758,597
TRANSMISSION
Filed Feb. 18, 1929  4 Sheets-Sheet 2

INVENTOR
Henry Ford.
BY E. R. Halbert.
E. L. Davis.
ATTORNEYS.

May 13, 1930. H. FORD 1,758,597
TRANSMISSION
Filed Feb. 18, 1929 4 Sheets-Sheet 3

INVENTOR
Henry Ford.
BY C. R. Halbert.
E. L. Davis.
ATTORNEYS.

May 13, 1930.                    H. FORD                    1,758,597
                              TRANSMISSION
                   Filed Feb. 18, 1929        4 Sheets-Sheet 4

INVENTOR
Henry Ford.
BY C. R. Halbert
E. L. Davis
ATTORNEYS.

Patented May 13, 1930

1,758,597

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

TRANSMISSION

Application filed February 18, 1929. Serial No. 340,733.

The object of my invention is to provide a transmission of the planetary type to be secured to the rear clutch housing of the conventional automobile engine and which may be operated by the conventional clutch pedal and shift rod.

A further object of my invention is to provide a planetary transmission having a number of brake drums therein and means controlled by a shift lever whereby each of these drums may be selectively held from rotation so as to give a different gear reduction in the transmission.

Still a further object of my invention is to provide a planetary transmission wherein the drum members are selectively held stationary by a pair of shoes clamped against each drum by spring pressure, the non-engaging shoes being held away from the drums, against the spring pressure, by a control mechanism operated by the shift lever.

In the conventional type of planetary transmission, the drums are held from rotation by forcing a stationary band against the adjacent drum by means of a foot pedal to thereby stop the drum. In my improved transmission there is no means for clamping the drum by the action of a foot pedal, the clamping being accomplished by the pressure exerted constantly by a pair of coil springs. A stop mechanism, controlled by the shift lever, is inserted between each pair of shoes which are not to be engaged.

Still a further object of my invention is to provide a planetary transmission having metal bands operating against metal drums to clamp the same against rotation, the bands being used only to absorb the inertia of the rotating drum there being a separate clutch provided to absorb the friction produced when the engine is connected to the driving wheels.

In all previous planetary transmissions the bands have been used to absorb the friction produced when the load picks up to the speed of the engine, and considerable trouble has arisen because these bands would heat excessively and glaze or burn the linings thereon. In my improved transmission the bands are not provided with linings, as practically no friction is absorbed by these bands. The transmission is provided with an engine clutch through which the torque of the engine is taken for every speed and is quite similar in this respect to the ordinary sliding gear transmission clutch construction.

This engine clutch is first thrown out and then one of the bands is allowed to clamp itself against the adjacent drum thereby almost instantly stopping the drum and holding it against rotation, and then the engine clutch is thrown in to bring the load up to engine speed and to absorb the friction produced by this change of speed. It may readily be seen that no lining is required on these bands and, that as very little friction is absorbed, the life of these bands is practically indefinite. Further, as the coefficient of friction is greater for stationary parts than sliding parts, a less pressure is required to hold the drums than to stop them.

Still a further object of my invention is to provide a planetary transmission having bands of V-shaped cross section to thereby reduce the pressure required to hold the adjacent drum against rotation. The idea of using a V-shaped brake band is not new, but heretofore in planetary transmission design, flat bands have almost universally been used due to the ease in which the lining might be secured to the band. It is extremely difficult to secure the fabric to the sides of a V-shaped band as a special molded fabric must be procured and further, there is no adequate means for riveting this fabric to the band. In this transmission the bands require no fabric or lining and consequently the V type band has been used thereby materially reducing the pressure required to hold the drum.

Still a further object of my invention is to provide a planetary transmission having a servo operated engine clutch, direct drive clutch and band releasing mechanism whereby these parts may be thrown out successively in the order named and engaged in the reverse order. In this device a suitable hydraulic pump is operated by the engine and the clutch pedal merely controls the discharge from this pump to various operating cylinders thereby assuring an extremely easy operated clutch pedal together with positive operation for the various parts.

Still a further object of my invention is to provide a planetary transmission wherein four forward speeds and one reverse speed are selectively obtained by the movement of a lever similar to a sliding gear transmission shift lever, the positions of the shift lever for the three highest forward speeds and the reverse speed being identical with the positions on a so-called standard sliding gear transmission, and the position of the first forward speed being obtained by moving the shift lever forwardly through the reverse speed position.

Still a further object of my invention is to provide a planetary transmission wherein the control mechanism can be operated only when the clutch pedal is depressed and in which it will be impossible to cause a clashing of any gears or chattering of the bands.

Still a further object of my invention is to provide a planetary transmission wherein the reverse speed, first speed and second speed are obtained through a compound epicyclic gear train, the third speed being obtained through a simple epicyclic gear train and the fourth speed obtained through a direct drive from the engine.

It has been universally recognized that the simple epicyclic gear train is extremely efficient and almost silent in operation, being very much superior in this respect to either the compound epicyclic gear train or the sliding gear construction, and so I have provided the third speed, or that speed which may be used continuously in hilly country or in deep sand with this simple epicyclic gear train.

With these and other objects in view, my invention consists in the arrangement, construction, and combination of the various parts of my improved device, as described in the specification, claimed in the claims, and illustrated in the accompanying drawings, in which:

Figure 1 shows a side elevation of my improved transmission secured to an ordinary engine.

Figure 7 shows a view taken on the line 7—7 of Figure 3.

Figure 8 is a diagram illustrating the position of the upper end of the shift lever for obtaining the various speeds in the transmission.

Figure 9 shows a diagrammatic view of one of a pair of control bars used for selectively obtaining the third and fourth forward speeds in the transmission, and Figure 10 shows a similar diagrammatic view of one of a pair of control bars used for selectively obtaining the reverse, first forward and second forward speeds in the transmission.

Figure 4:
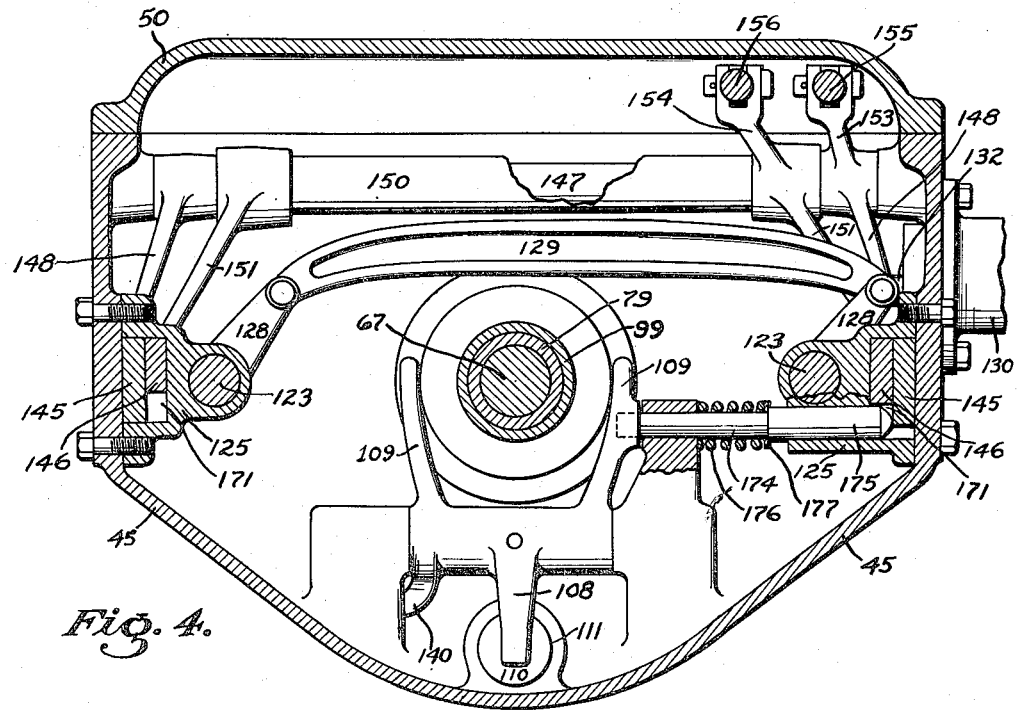
Figure 4 shows a sectional view taken on the line 4—4 of Figure 3.

My improved transmission would normally be sub-divided into a number of parts namely, the engine clutch, the gearing, the direct drive clutch, the clutch control mechanism, the drum clamping mechanism, and the shift lever control for the drum clamping mechanism. The description of the various parts will, therefore, be given in this order.

Referring to Figure 1, I have used the reference numeral 10 to indicate generally an engine used in an automobile having a clutch housing 11 extending rearwardly therefrom to which my improved transmission is bolted. An engine flywheel 12 is secured to the rear end of the engine crank shaft 13 in the conventional manner by means of flange 14 and bolts 15.

An outer clutch ring 16 has a radially extending flange 17 secured to the forward face of flywheel 12, and the bore of this clutch ring 16 is provided with suitable teeth 18 to form a driving means for driving clutch plates 19 of the clutch proper. Driven clutch plates 20 are disposed alternately to the driving plates 19 and have their internal edges notched so as to co-act with correspondingly notched shaped teeth 21 which are formed on the exterior of a driven clutch drum 22. The clutch drum 22 is secured to the clutch shaft 23 by any suitable means, as by splines 24 and a nut 25.

This clutch shaft 23 is rotatably mounted at its forward end in a suitable ball bearing 26 mounted in the flywheel 12, and at its rearward end by a second ball bearing 27 which is mounted in a clutch cover plate 28. This cover plate 28 is bolted to the rear face of the clutch housing 11. A clutch operating sleeve 29 is slidably mounted on the shaft 23 and has a radially extending flange 30 adjacent to its forward end to which pins 31 are secured. These pins 31 extend forwardly from the flange 30, through suitable openings in the clutch drum 22 and are secured to a suitable ring 32 forwardly of this drum.

A dished shaped clutch applying disc 33 extends from the ring 32 to position adjacent to the driven clutch plates 20. A retaining ring 34 is mounted in a suitable groove in the exterior edges of the teeth 21 for the purpose of preventing the clutch plates from being forced off the rear edge of the drum 22.

A clutch spring 35 is mounted around the shaft 23 between the drum 22 and the flange 30. A clutch throw out bearing 36 is mounted on the sleeve 29 and an operating ring 37 co-acts with the bearing 36 to compress the clutch spring 35 and relieve the spring pressure from the clutch plates 19 and 20.

A clutch throw out lever 38 is pivotally mounted in the cover member 28 by means of pin 39, its upper forked end co-acting with the clutch operating ring 37 and its lower end co-acting with a hydraulic piston 40, reciprocally mounted in a suitable cylinder 41, formed integrally with the cover plate 28.

A cylinder head 42 is screwed into the forward end of cylinder 41 so as to facilitate machining. A fitting 43 is screwed into the cover member 28, adjacent to the cylinder 41, and is connected thereto by a suitable opening 44 in the cover plate 28.

The construction of this engine clutch is quite similar to designs now in use, the clutch operating mechanism being the only radical departure from conventional design.

The operation of the device is as follows:

Oil from any suitable source is admitted under pressure to the cylinder 41 by a control valve, operated by the clutch pedal. The plunger 40 is forced rearwardly thereby rotating the clutch operating arm 38 on the pin 39 which in turn forces the flange 30 forwardly by means of the thrust bearing 36. The clutch spring 35 is thereby compressed relieving the pressure on the plates 19 and 20. When this spring pressure is relieved the clutch is, of course, thrown out and there is no driving connection between the flywheel 12 and the clutch shaft 23. When the pressure is relieved in the cylinder 41, the spring 35 returns the parts to their engaged positions and the clutch is automatically thrown in.

The engine clutch just described is a so-called dry clutch, there being no lubricant in the clutch housing 11 or around the clutch plates 19 and 20. The clutch is enclosed solely to prevent dust and dirt from entering and thereby causing wear on the parts.

The transmission gearing which will now be described is at all times immersed in an oil bath.

A transmission housing 45 is bolted to the rear face of cover plate 28 by bolts 46 and extends rearwardly therefrom. A rear ball bearing 47 is mounted in the rear wall of the housing 45 and is secured therein by a universal joint housing 48 which is secured to the housing 45 by the bolts 49.

A removable cover plate 50 encloses the upper part of the housing 45 so as to provide access to the various parts of the transmission. The gearing, operating mechanism, and control mechanism are all disposed within the housing 45 and the cover plate 50 and are constantly lubricated and protected from dust and dirt.

The clutch shaft 23 has a radial flange 51 extending from its rear end to which a planet carrier plate 52 is riveted by rivets 53. The carrier plate 52 is provided with a tubular member 54 to which it is riveted by rivets 55.

The complete planet carrier assembly, which will hereafter be referred to by numeral 54, consists of the tubular member 54, carrier plate 52, flange 51 and clutch shaft 23. These parts are all permanently secured together and, if it were not for manufacturing difficulties, might be made in one piece.

The carrier 54 is provided with three equally spaced parallel pin receiving openings 56 into which planet pins 57 are non-rotatably mounted. The drive at all times other than the third speed is obtained through the pins 57. A planet gear assembly 58 is rotatably mounted on each of the pins 57 by means of roller bearings 59. The planet gear assembly 58 consists of a reverse gear 60 cut on the extreme rear end of the planet gear 58 which is followed by a first speed gear 61 which in turn is followed by a second speed gear 62. A driving gear 63 is cut on the extreme forward end of the gear assembly 58.

An internal gear 64 is machined in a rearwardly extending sleeve 65 which is made integral with the plate 52. The sleeve 65 has three suitable slots 66 machined therein to accommodate the driving gears 63 of planet gears 58.

A driven shaft 67 is rotatably mounted at its forward end in a bearing 68 in the rear end of the clutch shaft 23 which in turn is rotatably mounted in the bearing 27. The rear end of the shaft 67 is directly mounted in the ball bearing 47. A universal joint 69 is secured to the rear end of shaft 67 by means of splines 70 and nut 71. The driven shaft 67 is thus rotatably mounted at each end in the transmission housing 45 and is thereby capable of carrying the weight of the various parts of the mechanism which are mounted thereon.

The shaft 67 is provided with a flange 72 just rearwardly of the bearing 68 and a driven gear 73 is secured thereto by means of bolts 74. A second planet carrier 75 is also secured to the flange 72 by means of the bolts 74. This second planet carrier 75 is smaller but very similar to the planet carrier 54 in that it has three parallel and equally spaced openings 76 therein, in which planet pins 77 are secured. Planet gears 78 are rotatably mounted on pins 77.

A sleeve 79 is rotatably mounted on the shaft 67 and extends between the flange 72 and the bearing 47. The forward end of the sleeve 79 is provided with a sun gear 80 which is in constant mesh with the planet gears 78, gears 78 also being in constant mesh with the internal driving gear 64. A brake drum 81 is secured to the rear end of the sleeve 79 for the purpose of holding the sleeve against rotation.

The gearing just described is the third forward speed and is independent of the other speeds in the transmission.

Figure 6:
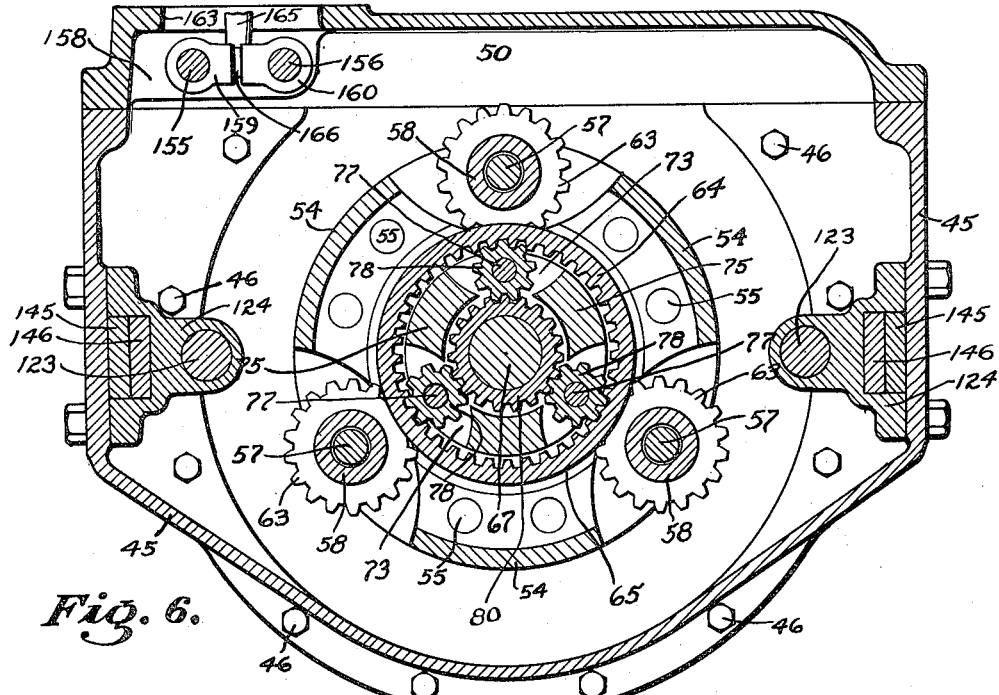
Figure 6 shows a sectional view taken on the line 6—6 of Figure 3.

In effecting this third speed drive, the sleeve 79 is held stationary thereby holding sun gear 80 stationary. The internal gear 64, being connected to the clutch shaft 23 is rotated at engine speed in a counter clockwise direction, referring to Figure 6, and the planet gears 78 are thereby rotated in the same or counter clockwise direction at a reduced speed, the ratio of which will be to the driving shaft 23 as the number of teeth in the internal gear 64 is to the sum of the number of teeth in the internal gear 64 plus the number of teeth in the sun gear 80. In the design shown this reduction amounts to about 70% and is ideally suited for a third speed drive. The drum 81 is held from rotation by means of a clamping device which will be described later.

The reverse, first speed, and second speed are accomplished through a compound epicyclic gear train. A second speed driving sleeve 82 is rotatably mounted on the sleeve 79 between the planet carrier 75 and the third speed drum 81. A second speed sun gear 83 is formed on the forward end of the sleeve 82 and is in constant mesh with the planet gear 62. A second speed brake drum 84 is secured to the rear end of this sleeve just forwardly of the drum 81. The drums 81, and 84 have also been adapted to form a direct drive clutch housing which will be described later.

A first speed sleeve 85 is rotatably mounted on sleeve 82 between the sun gear 83 and the brake drum 84. A first speed sun gear 86 is formed on the forward end of the sleeve 85 and in constant mesh with the planet gear 61. A brake drum 87 is secured to the rear end of this sleeve 85.

A reverse speed sleeve 88 is rotatably mounted on the sleeve 85 between the sun gear 86 and the brake drum 87. A reverse speed sun gear 89 is secured to the forward end of sleeve 88 and in constant mesh with the planet gears 60. A reverse brake drum 90 is secured to the rear end of this sleeve by means of the flange 91 and the rivets 92.

The intermediate portion of the reverse speed sleeve 88 is rotatably mounted in a roller bearing 93 which is housed in a suitable bore in the rear wall of the planet carrier 54.

Briefly, the construction just described consists of a central driven shaft upon which four sleeves are rotatably mounted, one over the other. The forward end of each sleeve is formed integrally with or secured to a sun gear and the rear end of each sleeve is secured to a brake drum. All of the sleeves are mounted concentrically and are free to rotate independently of each other. The reverse speed sun gear 89 is in constant mesh with each of the reverse planet gears 60 and likewise, the first and second speed sun gears 86 and 83, respectively, are in constant mesh with the first and second speed planet gears 61 and 62, respectively.

The method of calculation used to determine the various gears of the device will not be gone into here as the device is of the well known compound epicyclic gearing. It may be well to state, however, that the gear 89 is of slightly larger pitch diameter than the gear 73 and that the gears 86 and 83 are of smaller pitch diameter than the gear 73. This accounts for the reverse speed and the first and second forward speeds of the device as when a sun gear is made larger than the driving gear a reverse speed is obtained and when it is made smaller than the driving gear a forward speed is obtained.

The number of teeth in each of the gears of the device must be divisible by 3 when 3 planet gears are used. This applies to all of the gears in the device, otherwise it would be impossible to assemble the transmission. Further, the sum of the pitch diameters of any sun gear and its respective planet gear must be equal to the sum of the pitch diameters of the sun gear 73 and the planet gear 63.

These facts are quite well known in the planetary gearing art, however, they have been brought out here to merely illustrate the compactness and relative simplicity of the applicant's design.

The operation of the device is as follows:

The clutch shaft 23 and planet carrier 54 are the driving members in the transmission at all times and rotate at engine speed when the engine clutch is in.

When the reverse speed is desired, the reverse drum 90 is held from rotation thereby holding the sun gear 89 stationary and allowing the planet carrier 54 and the planet pinions 58 to rotate around it. The drive shaft 67 is permanently connected to the driven gear 73 and this gear 73 having a smaller pitch diameter than the sun gear 89 is consequently rotated in a reverse direction at a reduced speed.

When the first speed is desired, the drum 87 is clamped from rotation, the other three drums of course being free to rotate, thereby holding the sun gear 86 against rotation. This gear 86 being of a slightly smaller pitch diameter than the driven gear 73, the latter is driven at a very reduced speed in a forward direction.

The second speed is accomplished in a similar manner by clamping the drum 84 which holds the sun gear 83 against rotation and, it being of a still smaller pitch diameter than the driven gear 73, the latter is driven at a somewhat faster reduced speed in a forward direction.

The third speed is likewise obtained by clamping the drum 81 which holds the sun gear 80 against rotation, the drive at this time being taken from the internal gear 64. The planet carrier 75 is thus driven in a forward direction at a slightly reduced speed. The planet carrier 75 is, of course, secured to the shaft 67 thereby driving this shaft.

The direct or high speed drive is accomplished by clamping two of the brake drums together thereby locking the gearing against relative rotation and causing the whole to rotate as a unit. The last two drums of the device have been used for this purpose because they are more accessible and facilitate the operation of the locking mechanism.

The drum 81 has internal clutch driving teeth 94 machined in its inner bore and the drum 84 has a small sleeve 95 fixed thereto and extending rearwardly therefrom upon which a number of external clutch driving teeth 96 are machined. The teeth 94 and 96 are concentric and aligned with each other and driving clutch discs 97 are connected to the teeth 94 and alternately spaced with the driven clutch discs 98 which are connected to the driven clutch teeth 96.

The brake drum 81 has a rearwardly extending hub member 99 through which it is secured to the sleeve 79. A flange 100 extends radially from the rear end of the hub 99 and forms a rear support for the direct drive clutch spring 101.

A rear ball thrust bearing 102 is placed between the flange 100 and the ball bearing 47 to absorb the thrust produced by the clutch spring 101.

A clutch throw out sleeve 103 is slidably mounted upon the hub 99 and houses the clutch spring 101 and also forms the forward support for this spring. A flange 104 extends radially from the rear end of the sleeve 103 and a clutch throw out bearing 105 is mounted on this sleeve 103 adjacent to this flange 104.

A number of clutch fingers 106 are pivotally mounted near the periphery on the rear wall of the drum 81 and extend inwardly in position to co-act with the forward end of the sleeve 103. Pins 107 apply the spring pressure produced on the clutch fingers to the discs of the clutch in the conventional manner.

A clutch operating lever 108 is pivotally mounted in the housing 45 and has a pair of arms 109 extending upwardly and co-acting with the throw out bearing 105. The clutch operating lever 108 extends downwardly to position to co-act with a piston 110 which is reciprocably mounted in a cylinder 111 machined in the rear wall of the housing 45. A hydraulic fitting 112 is secured adjacent to the cylinder 111 in the rear wall of the housing 45 and is connected to cylinder 111 by a port 113 in the housing.

The operation of the direct drive clutch is as follows:

Oil under pressure is forced through the fitting 112, port 113, and into cylinder 111 where it forces the piston 110 forwardly thereby rotating the lever 108 and the clutch operating arms 109. The clutch spring 101 is thereby compressed and the clutch disks 97 and 98 are thereby freed to move relative to each other. The drums 81 and 84 are likewise free to rotate relative to each other.

The operation of this direct drive clutch is very similar to that of the engine clutch which has previously been described. The only important structural difference between the two is that in the direct drive clutch the spring pressure has been increased by means of the clutch fingers 106, because this clutch operates in an oil bath whereas the engine clutch is a dry clutch.

Figure 5:
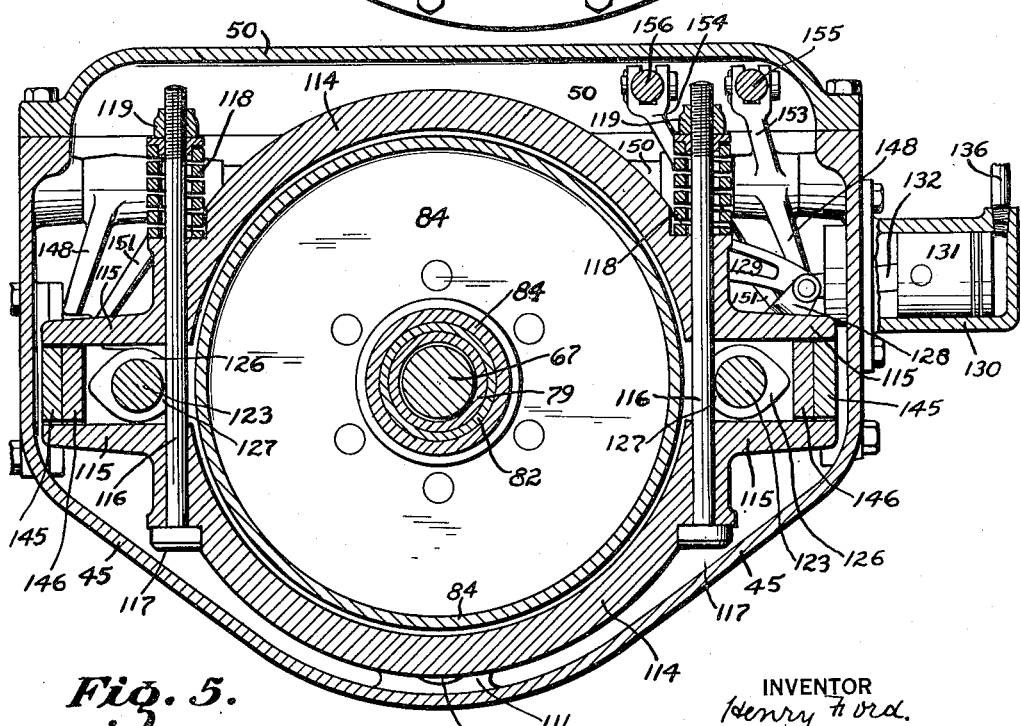
Figure 5 shows a sectional view taken on the line 5—5 of Figure 3.

The brake drum clamping mechanism, which is one of the most important and novel features of the applicant's invention, will not be described. Each of the four previously mentioned brake drums have a similar V shaped groove formed in their periphery with correspondingly shaped shoes co-acting. Referring to Figure 5, the brake drum 84 is surrounded by a pair of brake shoes 114. Each of the shoes 114 are slightly less than a semi-circle in extent and have an ear 115 extending transversely from each end of each shoe.

A pair of bolts 116 extend through each end of each shoe 114 adjacent to the drum 84. Each bolt 116 has a head 117 co-acting with a lower shoe, the shank portion of the bolts 116 extending upwardly through the upper shoe. A compression spring 118 is placed around the extended portion of the bolts 116 and exerts a pressure against the upper shoe 114 through a nut 119. The shoes 114 are always urged together toward the drum 84 by the action of the spring 118.

As a matter of convenience, each shoe assembly on each of the brake drums will be given a reference number. The reverse drum 90 has shoe assembly 120, the first speed drum 87 has shoe assembly 121, the second speed drum 84 having shoe assembly 114, and the third speed drum 81 having shoe assembly 122. Each of the shoe assemblies are identical in construction and operation and perform the same function of holding their respective drums against rotation.

A pair of cam shafts 123 extend parallel to the driving shaft 67, one shaft being on each side of the transmission brake drums. The cam shafts 123 are suitably pivoted in front and rear bearings 124 and 125, respectively. These bearings are removably secured to the interior walls of housing 45.

An oval shaped cam 126 is provided on each cam shaft adjacent to each pair of shoes and is disposed between the ears of said shoes so that when the cam shaft 123 is rotated the cams 126 will separate the shoes against the pressure exerted by springs 118. The cams 126 have grooves 127 in the center to receive the bolts 116 thereby holding the shoe assemblies in alignment with the cams 126 at all times.

The rear end of each cam shaft 123 has an arm 128 extending upwardly therefrom and a link 129 connects these arms together so that when the link 129 is moved transversely each cam shaft 123 will be rotated thereby separating the brake shoes and releasing the brake drum for rotation.

A cylinder 130 is secured to one wall of the housing 45 and a piston 131 is mounted therein for reciprocation in a horizontal plane. A connecting rod 132 connects the piston 131 with the link 129.

When oil is forced into the cylinder 130, the piston 131 is forced outwardly thereby moving the link 129 transversely which in turn rotates both cam shafts 123. The brake shoes are thereby separated and the brake drums are relieved of the clamping effect of the brake shoes.

Figure 2:
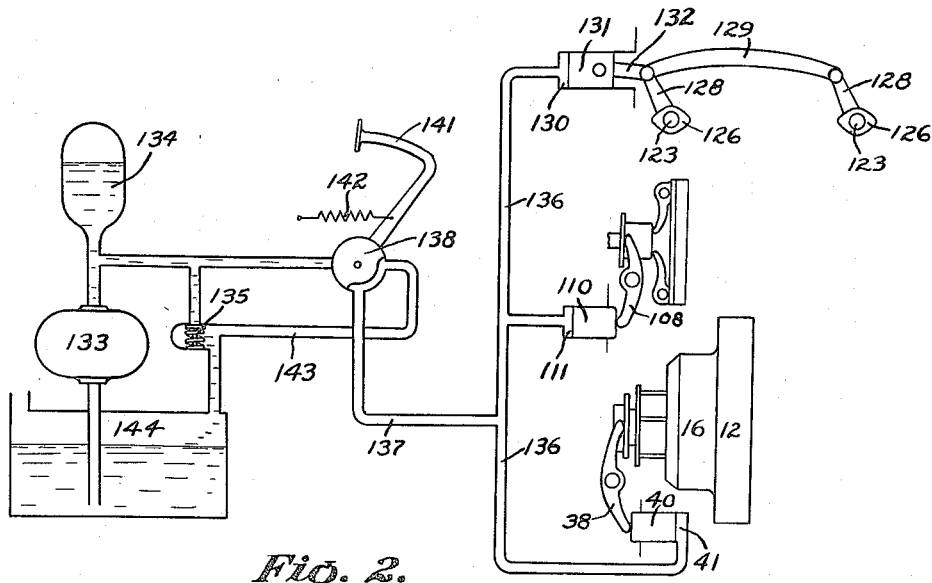
Figure 2 shows a schematic diagram of the servo clutch and band operating mechanism together with the pedal operated control valve.
Figure 3:
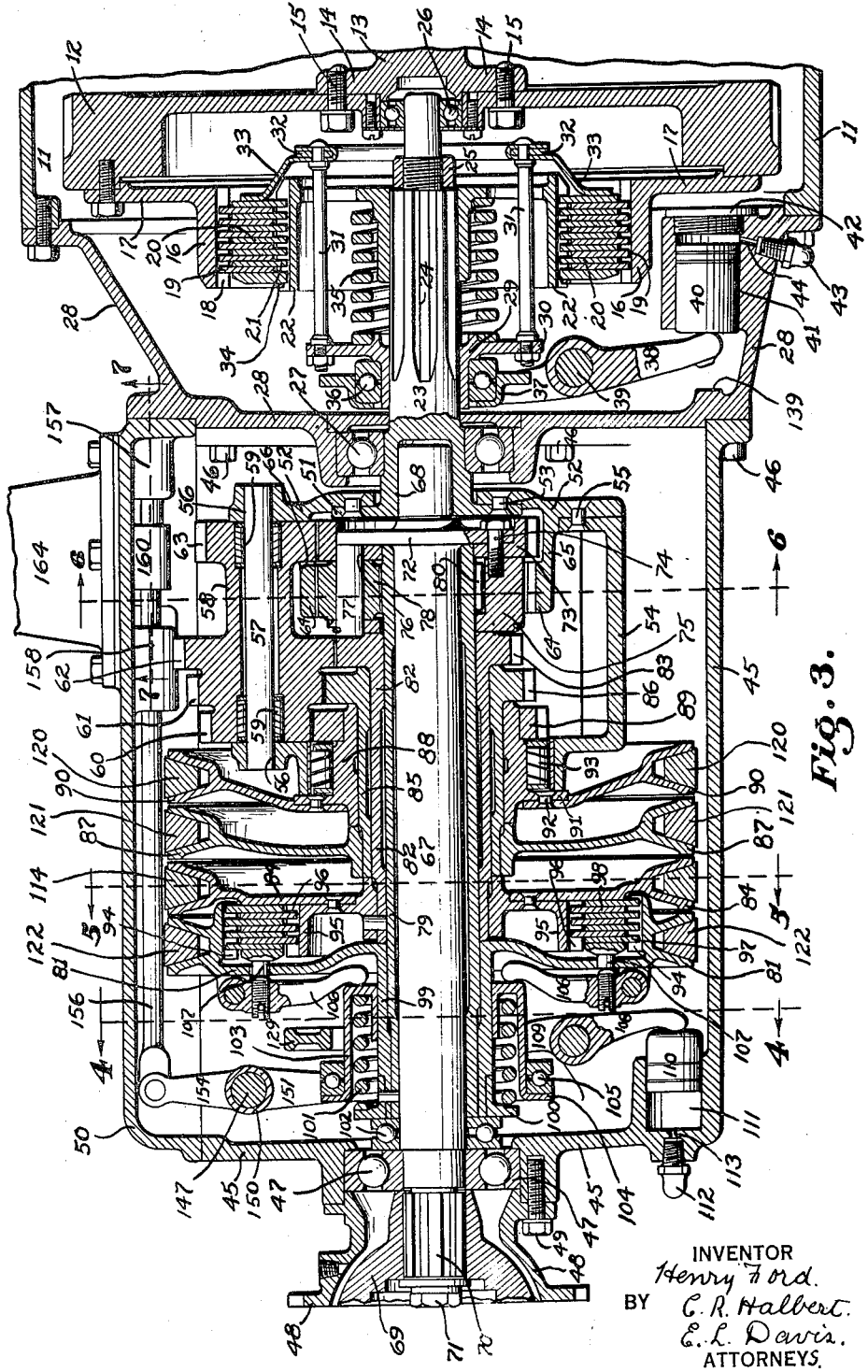
Figure 3 shows a vertical, longitudinal, central, sectional view through my improved transmission.

Referring to Figure 2, a schematic diagram of the operation of the various plungers in the device is shown. A suitable oil pressure pump 133 is driven by the engine 10 when it is operating. This pump may either be of the reciprocating or of the rotary type. An air pressure dome 134 is provided and also a pressure regulating valve 135. The cylinders 41, 111, and 130 are connected by a suitable tube 136 which is connected to a tube 137 from a control valve 138.

The oil under pressure is conducted through valve 138 into tube 137, tube 136 and to each of the cylinders 130, 111, and 41 thereby operating all of the pistons therein and tending to force the pistons out simultaneously. The area of the pistons in relation to the amount of work or spring pressure which the piston must overcome is so proportioned that the main engine clutch will be first thrown out, the lever 38 striking against the stop 139 in the cover plate 28, then the direct drive clutch will be thrown out until an arm 140, extending downwardly from the arm 109 strikes against a suitable stop in housing 45 and then the cam shafts 123 will be rotated through 90° or until the link 129 strikes against the bearing block 125.

When the oil pressure is relieved the various devices will engage in the reverse order. The cam shafts must first rotate and allow the desired shoes to stop their respective drum before any power is placed on the transmission. There being only the inertia of the drum to overcome, the drum will be stopped almost instantaneously. The engine clutch may then be thrown in thereby taking the friction produced when the load picks up to the speed of the engine. This obliviates the necessity of providing lining for any of the shoes or for the direct drive clutch.

The only manual work to be performed by the operator of the device is to press a clutch pedal 141 against the almost negligible pressure of a return spring 142 thereby operating the control valve 138 so that the pump 133 is connected to the various cylinders. This forces the pistons out in the order just named and holds them out until the pedal is allowed to return by the action of spring 142 at which time valve 138 will connect the various cylinders through tubes 136 and 137 with a tube 143 which runs to the low pressure side of the system and to the reservoirs 144. The pistons will then be allowed to return to their inner positions in the cylinders thereby engaging the braking shoes or the clutches.

It will be understood from the foregoing that only one of the drums can be held from rotation at one time and that when the direct drive clutch is engaged none of the drums may be held from rotation. The applicant has devised a novel selective mechanism for engaging either the direct drive clutch or any one of the drums.

A pair of control bars are slidably mounted in each of the bearings 125 and 124 and extend between the projecting ends of the ears 115 and have enlarged portions formed thereon so that by positioning each bar the brake shoes may be held apart against the action of the springs 118 or may be allowed to clamp themselves against the drum.

A bar 145 extends between the extreme ends of the ears 115 at each side of the transmission the bars at each side being similarly placed and identical in shape. A second pair of identical bars 146 are similarly mounted just inwardly of the bars 145. Each pair of ears has both a bar 145 and a bar 146 therebetween.

A shaft 147 is journalled transversely in the housing 45 and a pair of arms 148 extend downwardly from the ends of this shaft. Each arm is loosely connected to one of the bars 145 by means of pins 149. A sleeve 150 is rotatably mounted on the shaft 147 between the arms 148 and also has two downwardly extending arms 151 each similarly connected with one of the bars 146 by means of pins 152. One of arms 148 has an upwardly extending arm 153 and one of the arms 151 also has an upwardly extending arm 154.

Referring to Figure 4, when the arm 153 is moved forwardly the shaft 147 will be rotated which will in turn move arms 148 and bars 145 rearwardly. Likewise, when arm 154 is moved forwardly the sleeve 150 will be rotated and move arms 151 and bars 146 rearwardly. Both bars 146 are always connected together and with the arm 154 and also both bars 145 are always connected together and with the arm 153 so that movement of either one of these arms, 153 or 154, forward or backward will move the corresponding set of bars, 145 or 146.

The pair of bars 146 only control the reverse, first and second speeds of the transmission, the third and direct drive speed being controlled by the adjacent pair of bars 145.

Referring to Figure 9, bar 145 has slots 172 of a length sufficient to allow the reverse, first and second bands to clamp their respective drums independently of this bar when it is in its neutral position. Other slots 173 are provided in the bar 145 to the rear of slots 172 so that when the bar 145 is moved toward the right the third speed band 122 will be free to drop in this slot and clamp the respective drum.

When the transmission is in neutral position or any of the positions other than the direct drive, the direct drive clutch must be held disengaged. Means are provided, as shown in Figure 4, which consists of a pin 174 mounted to slide transversely in one of the bearings 125 and an extension from the housing 45. An enlarged ball ended head portion 175 is provided on pin 174 and a compression spring 176 urges the pin outwardly against the bar 145 by engaging the washer 177 against the rear shoulder of the head 175.

When the device is in the neutral position shown in Figure 4, the inner end of pin 174 restrains the clutch operating arm 109 from allowing the direct drive clutch to be engaged. The rear edge of the lower slot 173 in bar 145 is bevelled as at 178 so that a movement of this bar from the extreme position at the left to the neutral position will force the pin 174 forwardly to the position shown in Figure 4. When the bar 145 is moved toward the left the lower recess 173 allows the pin 174 to be urged by spring 176 outwardly and into this recess thereby allowing the direct drive clutch operating arm to engage the clutch. This accomplishes a direct or fourth speed drive.

It will be remembered that the engine clutch is the first to disengage and then the direct drive clutch and then the clamping bands and there can be no interference between the arm 109 and pin 174 because the direct drive clutch is always disengaged when the bars are moved.

A pair of horizontal extending rods 155 and 156 are connected through suitable clevis connection with the arms 153 and 154, respectively. Both rods 155 and 156 are mounted to reciprocate in the cover plate 50 in suitable bearings 157 and 158.

Referring to Figure 7, the rod 155 has a block 159 secured thereon between the bearings 157 and 158. A similar block 160 is similarly secured to rod 156, the two blocks having shift lever ball receiving recesses 161 and 162 in each, respectively.

The cover plate 50 is provided with an opening 163 directly over the blocks 159 and 160 and a conical shift lever housing 164 is mounted on the cover plate over this opening in the conventional manner. A shift lever 165 is universally mounted in the upper end of this housing 164 so as to be free to move horizontally and into either recess 161 or 162. A ball 166 is provided on the lower end of the shift lever 165 to co-act with the recesses 161 and 162.

An inter-locking device, consisting of a pair of ball ended cup members 167 having a spring 168, is provided in bearing 158 in the conventional manner so as to co-act with suitable notches in the rods 155 and 156 thereby making it impossible to move both rods horizontally simultaneously, and also providing a means for resiliently holding the rods in a desired position when the brake shoes are relieved.

From the foregoing, it will be seen that when the block 160 is shifted towards the left it will move the both bars 146 toward the right by means of the rod 156, the arm 154, the sleeve 150, and the arms 151. Likewise, when the block 159 is shifted it will move both bars 145 in the opposite direction by means of the rod 155, the arm 153, the shaft 147 and the arms 148.

The numerals 1, 2, 3, and 4 and letter R, shown in Figures 7, 8, 9 and 10, refer to the positions to which each part must move in order to obtain the desired speed represented by the numeral or letter or indicate the part which must move to secure said speed ratio. In all of the views the transmission is shown in the neutral position.

Referring now to Figure 10, the bar 146, when in the neutral position, prevents the shoe 114, 121 and 120 from clamping on their respective drums.

When this bar 146 is moved toward the left the reverse shoes 120 are free to drop into slots 170 in the bar 146 and thereby clamp the reverse drum against rotation. When the movement of the bar 146 is carried farther to the left, the first speed shoes 121 are then permitted to drop into the slots 170 and the reverse shoes 120 are held out by the forward end of this bar. When the bar 146 is moved toward the right of the position shown, the second speed shoes 114 are then permitted to drop into slots 171 in the bar 146 and thereby clamp the second speed drum.

The pair of bars 146 only control the reverse, first and second speeds of the transmission, the third and direct speed being controlled by the adjacent pair of bars 145.

It is only possible to shift either bar when the brake shoes are held in their disengaged position by the cams 126. When the shoes are thus disengaged either pair of the bars 145 or 146 are free to be moved longitudinally by the shift lever 165 but are prevented from simultaneous movement by the interlocking device 167.

Figures 9 and 10 represent the positions assumed by each of the bars 145 and 146, respectively, but it should be remembered that in the device both of these bars are placed side by side between the same set of shoes. Thus, when the bars are so placed the direct drive clutch and the brake shoes 122 will be held in their disengaged position by the pair of bars 145, and the reverse speed, first and second speed shoes will be held in their disengaged positions by the pair of bars 146 Further, the bars 145 in no way interfere with the operation of the reverse, first and second speed shoes and likewise, the bars 146 in no way interfere with the operation of the third speed shoes or the direct drive clutch.

The operation of the device is as follows:

The clutch pedal 144 is depressed thereby rotating valve 138 which allows oil under pressure from the pump 133 to progressively disengage the engine clutch, direct drive clutch and finally the series of brake shoes. Both sets of shift bars, 145 and 146, are now free to reciprocate. The shift lever may be now moved to the desired position, as shown in Figure 8, which moves the pair of corresponding shift bars to their correct position.

The clutch pedal is then released thereby rotating valve 138 and allowing the cylinders 41, 111 and 130 to discharge the oil therein in the reservoir 144 and allowing one set of shoes to clamp or the direct clutch to engage, and the engine clutch to engage, progressively.

It is possible with this transmission to arrange practically any positions for the shift lever, however, I have chosen the positions shown in Figure 8, as being the most desirable from the operator's point of view.

Under normal operation conditions, the reverse speed, second speed, third speed and fourth or direct speed are the only speeds ordinarily used, the car being started on second speed and driven on direct speed. Consequently, a so-called standard gear shift arrangement has been provided for these four speeds.

When the car is being started in deep sand or mud, a reduced speed lower than the normal starting speed is required, and so the first speed has been placed ahead of the reverse speed position so that as the reverse and first speeds may be used alternately when driving the car out of the deep sand and the like.

Among the many advantages arising from the use of my improved device it should be pointed out that I have provided an epicyclic gear train transmission of four forward speeds and one reverse speed which may be operated by the conventional clutch pedal and shift lever; and that the four normal driving speeds are selectively obtained from a neutral position of the shift lever.

A further advantage results in that practically no manual work is done in depressing the clutch pedal, or shifting the shift lever thereby making transmission extremely easy to operate. Further, the shoes used with this transmission are urged against their respective drums by a constant spring pressure. These shoes do not require any brake lining because they only absorb the negligible friction produced by the inertia of the parts, the main engine clutch absorbing the friction produced when the load is brought up to speed.

A further advantage results in that the first, second, and reverse speeds are accomplished through a compound epicyclic gear train and the third speed, which is adapted to be used for continuous driving in hilly countries, is of the simple epicyclic gear train which is exceptionally quiet and very efficient.

Some changes may be made in my improved transmission without departing from the spirit of my invention, and it is my intention to cover by my claims such changes as may reasonably be included within the scope thereof.

I claim as my invention:

1. In a planetary transmission, a plurality of brake drums adapted to be held from rotation, a pair of brake shoes for each brake drum having an ear extending from each end of each shoe, a cam disposed between each pair of said ears, a pair of control bars disposed between each pair of said ears, a clutch pedal, and a shift lever, means for operating said cams by said clutch pedal and the means for operating said control bars by the said shift lever.

2. In a planetary transmission, a plurality of brake drums adapted to be held from rotation, a pair of brake shoes for each of said drums, having radial ears extending from each end of each shoe, a cam disposed between each pair of said ears, a pair of control bars disposed between each pair of said ears, a clutch pedal, a shift lever, a transverse shaft operating one of each pair of said bars, and a second transverse shaft operating the other of each pair of said bars, the said cams being simultaneously operated by the said pedal and the said shafts being selectively operated by the said shift lever.

3. In a planetary transmission, a plurality of brake drums, braking means for holding said brake drums from rotation, a cylinder and piston adapted to relieve said braking means, a direct drive clutch, a second cylinder and piston adapted to disengage said direct drive clutch, an engine clutch, a third cylinder and piston adapted to disengage said engine clutch, and a control pedal adapted to control the flow of fluid under pressure to each of the said cylinders and pistons.

4. In a planetary transmission, a plurality of brake drums, braking means for holding said brake drums from rotation, a piston and cylinder adapted to operate said braking means, a direct drive clutch, a second piston and cylinder adapted to disengage said direct drive clutch, an engine clutch, a third piston and cylinder adapted to disengage said engine, and a control means for simultaneously admitting pressure fluid to each of the said cylinders, the proportion of the parts being so designed that the said braking means will first engage, then the direct drive clutch will engage, and then the engine clutch will engage.

5. In a planetary transmission, a driving shaft having a planet carrier secured thereto, a plurality of planet gears rotatably mounted in said planet carrier, an internal gear secured to said planet carrier, a driven shaft having a second planet carrier secured thereto, a driven gear secured to said driven shaft and in position to mesh with said planet gears, a second plurality of planet gears rotatably mounted in said second planet carrier and adapted to be driven by said internal gear, a sun gear adapted to mesh with said first mentioned planet gears, a second sun gear adapted to mesh with said second mentioned planet gears and means for holding each of said sun gears from rotation.

6. In a planetary transmission, a planet carrier having a plurality of planet gears rotatably mounted therein, an internal gear secured to said planet carrier, a driven shaft having a second planet carrier and a driven gear secured thereto said driven gear being in mesh with said planet gears, a plurality of planet gears rotatably mounted in said second planet carrier, a plurality of sun gears in mesh with said first mentioned planet gears, said sun gears effecting the reverse, first and second forward speeds in the transmission, a second sun gear in mesh with said second mentioned planet gears for the purpose of effecting a third forward speed.

7. In a planetary transmission having a plurality of brake drums adapted to be held from rotation to selectively effect the gear ratios of the transmission, braking means for holding said drums from rotation, a direct drive clutch, an engine clutch, hydraulically operated means for releasing each of said clutches and braking means, and means for admitting fluid under pressure to each of said operating means simultaneously.

8. In a transmission having a plurality of potential gear ratios therein, a direct drive clutch, an engine clutch, hydraulically operated means for effecting each of said gear ratios, hydraulically operated means for releasing each of said clutches, and means for admitting fluid under pressure to each of said operating means simultaneously.

January 31, 1929.

HENRY FORD.